United States Patent [19]

Mizuide

[11] Patent Number: 5,382,886
[45] Date of Patent: Jan. 17, 1995

[54] ELECTRIC WAVEFORM GENERATING CIRCUIT FOR BRUSHLESS MOTOR

[75] Inventor: Yasuo Mizuide, Kawasaki, Japan

[73] Assignee: Kabushiki Kaisha Toshiba, Kawasaki, Japan

[21] Appl. No.: 61,002

[22] Filed: May 14, 1993

[30] Foreign Application Priority Data

May 18, 1992 [JP] Japan .................. 4-124454

[51] Int. Cl.⁶ .................. H02P 5/40; H03K 5/00
[52] U.S. Cl. .................. 518/807; 318/810; 318/254; 327/105
[58] Field of Search .................. 328/181, 14, 36, 127, 328/173, 35; 307/261, 264, 265, 228, 229, 304; 363/26, 41, 96, 136; 318/801, 439, 802, 798, 138, 807, 808, 809, 810, 811, 254

[56] References Cited

U.S. PATENT DOCUMENTS

| | | | |
|---|---|---|---|
| 3,610,952 | 10/1971 | Chandos | 328/181 |
| 4,041,894 | 8/1977 | Kimmich | 328/21 |
| 4,295,189 | 10/1981 | Boys | 328/21 |
| 4,367,521 | 1/1983 | Kohata et al. | 318/801 |
| 4,516,038 | 5/1985 | Glennon | 328/181 |
| 4,580,064 | 4/1986 | Varnovitsky | 307/265 |

FOREIGN PATENT DOCUMENTS 61-3193 1/1986 Japan .

*Primary Examiner*—Jonathan Wysocki
*Assistant Examiner*—John W. Cabeca
*Attorney, Agent, or Firm*—Foley & Lardner

[57] ABSTRACT

An electric waveform generator for a brushless motor includes a triangular wave generator including a Voltage Controlled Oscillator (VCO), a shift register, an inverting circuit, an analog switch group, and a synthesizer. The shift register generates specified timing signals synchronized with the oscillating cycle of the triangular wave from the triangular wave generator. The inverting circuit inverts the triangular wave from the triangular wave generator. The analog switch group selects the triangular wave and the inverted triangular wave based on the timing signals from the shift register. The synthesizer outputs trapezoidal waves based on the operation of the analog switch.

9 Claims, 5 Drawing Sheets

OUTPUT

TRAPEZOIDAL
WAVEFORMS

ELECTRIC WAVEFORM GENERATING CIRCUIT FOR BRUSHLESS MOTOR

BACKGROUND OF THE INVENTION

1. Field of the Invention

The present invention relates to an electric waveform generating circuit for a small brushless motor, and, in particular, to an electric waveform generating circuit for a brushless motor wherein the amount of noise accompanying the electromagnetic noise and rotation of the motor is small, there are few externally-connected parts, and the number of internal circuit structural elements thereof is greatly reduced.

2. Description of the Prior Art

Conventionally, in controlling the speed of a small brushless motor the relative positions of the field pole of the rotor and the armature winding are detected by means of position sensors, and the speed is controlled by a control circuit based on the detected positions.

In such a case it is difficult to provide position sensors with uniform characteristics to a motor, and the difference in the characteristics of the position sensors causes a problem by adversely affecting the operating characteristics of the position sensors under high speed rotation.

Various sensorless methods for driving the motor have been proposed to eliminate these problems in the prior art described above. The Phase-Locked Loop (PLL) method, which provides a phase detector and a voltage controlled oscillator, and a filter method are examples.

The speed of a conventional small brushless motor is mainly controlled by means of a hardware switching method using a switching element such as a transistor or the like.

When the current of the motor coil in a motor is changed digitally by the hardware-switching method, there is a tendency to produce magnetic noise and noise from the motor itself which is a problem.

With an apparatus which is adversely affected by noise, in particular in a motor used for a video camera set, a soft-switching method which provides analogue control of the commutation waveform is preferable.

There has recently been a demand for provision of a motor drive method using the sensorless and soft-switching method but there have been few cases of commercialization of such methods. Even when the method is commercialized, a large number of externally-mounted parts is required, or large-scale circuitry is necessary for digital processing.

As outlined above, with a circuit for generating electric waveforms for a conventional brushless motor, (1) the hardware-switching shows a tendency to produce magnetic noise and noise from the motor itself;

(2) in the soft-switching method which eliminates the problems of (1), a large number of externally-mounted parts is required to provide a brushless motor based on the soft-switching method, or large-scale circuitry is necessary for digital processing.

SUMMARY OF THE INVENTION

Accordingly, an object of the present invention is to provide, with due consideration to the drawbacks of such conventional circuits, an electric waveform generating circuit for a brushless motor utilizing a control circuit for a brushless motor for a motor drive method using a sensorless soft-switching method in which the amount of magnetic noise and noise resulting from rotation of the motor itself is small, and, in addition, the number of externally-mounted parts is small and large-scale internal circuitry is eliminated.

In accordance with a preferred embodiment, there is provided an electric waveform generating circuit for a small brushless motor having:

variable frequency generating means for generating a triangular wave;

inverting means for inverting the triangular wave output by the variable frequency generating means;

analogue switch means for opening and closing based on a specified timing signal synchronized with the oscillating cycle of the triangular wave from the variable frequency generating means for synthesizing the triangular wave and the reversed wave; and synthesizing means for outputting a synthesized wave form from the output of the analogue switch means.

In accordance with another preferred embodiment, there is provided an electric waveform generating circuit for a small brushless motor having an electric waveform generating circuit for a brushless motor having:

variable frequency generating means for generating a triangular wave;

pulse generating means for generating a specified timing signal synchronized with the oscillating cycle of the triangular wave from the variable frequency generating means;

inverting means for inverting the triangular wave output by the variable frequency generating means;

group of analogue switches which are opened and closed based on the control of the timing signal for synthesizing the triangular wave and the reversed wave; and synthesizing means for outputting a synthesized wave form from the output of at least one of the switches in the analogue switch group.

In accordance with an another preferred embodiment, there is provided a brushless motor with an electric waveform generating circuit described above, wherein the synthesized waves from the synthesizing means are input as a commutation signal for the motor.

BRIEF DESCRIPTION OF THE DRAWINGS

For a more complete understanding of the present invention and the advantage thereof, reference is now made to the following description taken in conjunction with the accompanying Drawings in which.

DETAILED DESCRIPTION OF THE PREFERRED EMBODIMENTS

First, the basic features of the present invention will be explained and then preferred embodiments of the present invention will be described.

One of the special features of an electric waveform generating circuit for a brushless motor of the present invention is a control circuit used for a brushless motor and by using a motor drive method using the sensorless soft-switching method.

Figure 1:
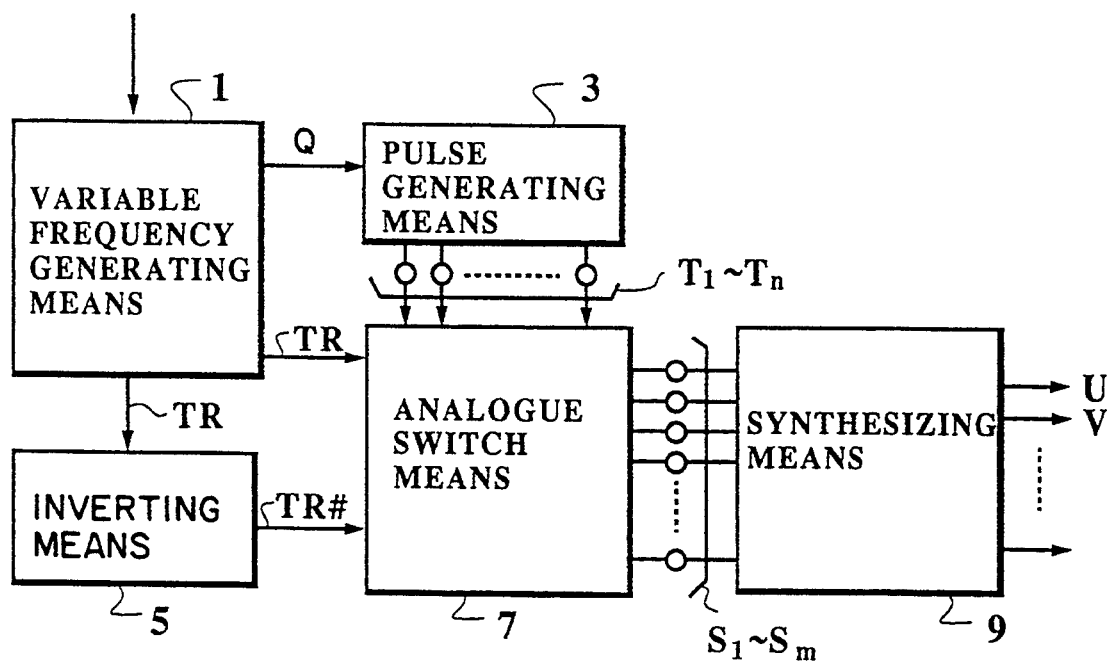
FIG. 1 is a basic block diagram for explaining the principle of the present invention.

FIG. 1 shows a block diagram of an electric waveform generating circuit used for a brushless motor according to the present invention.

The electric waveform generating circuit for a brushless motor of the present invention, as shown in FIG. 1, generates a triangular wave TR by means of a variable frequency generating means 1, and inverted triangular wave TR#, inverted by means of a inverting means 5, is then generated from the triangular wave TR.

Specified timing signals T1 to Tn synchronized to the oscillation cycle of the variable frequency generating means 1 are generated by a pulse generating means 3.

A total of m analogue switches are provided in an analogue switch group. These analogue switches m are opened and closed under the control of the timing signals T1 to Tn to synthesize the triangular wave TR and the inverted triangular wave TR#. At least one of outputs S1 to Sn of a synthesized wave form is output from the switches in the group 7 of the analogue switches SW1 to SW6 by a synthesizing means 9. In particular, with another feature of the electric waveform generating circuit for a brushless motor of the present invention, the output of the synthesizing means 9 is a three-phase trapezoidal waveform.

In addition, in another feature of the electric waveform generating circuit for a brushless motor of the present invention, the output of the synthesizing means 9 is used as a commutation signal for a three-phase motor. The waveforms of the triangular wave TR and the inverted triangular wave TR# are synthesized in this manner, and a three-phase trapezoidal waveform or the like is produced. Because this waveform is used as a commutation signal for a three phase motor, operation based on the soft-switching method is made possible.

In addition, because the waveform for soft-switching is obtained from the variable frequency generating means 1, there is no increase in the number of externally-mounted parts, and because the PLL method is used, the follow-up characteristics relating to changing of the number of rotations are highly superior.

The present invention will now be explained with reference to a preferred embodiment of the present invention.

Figure 2:
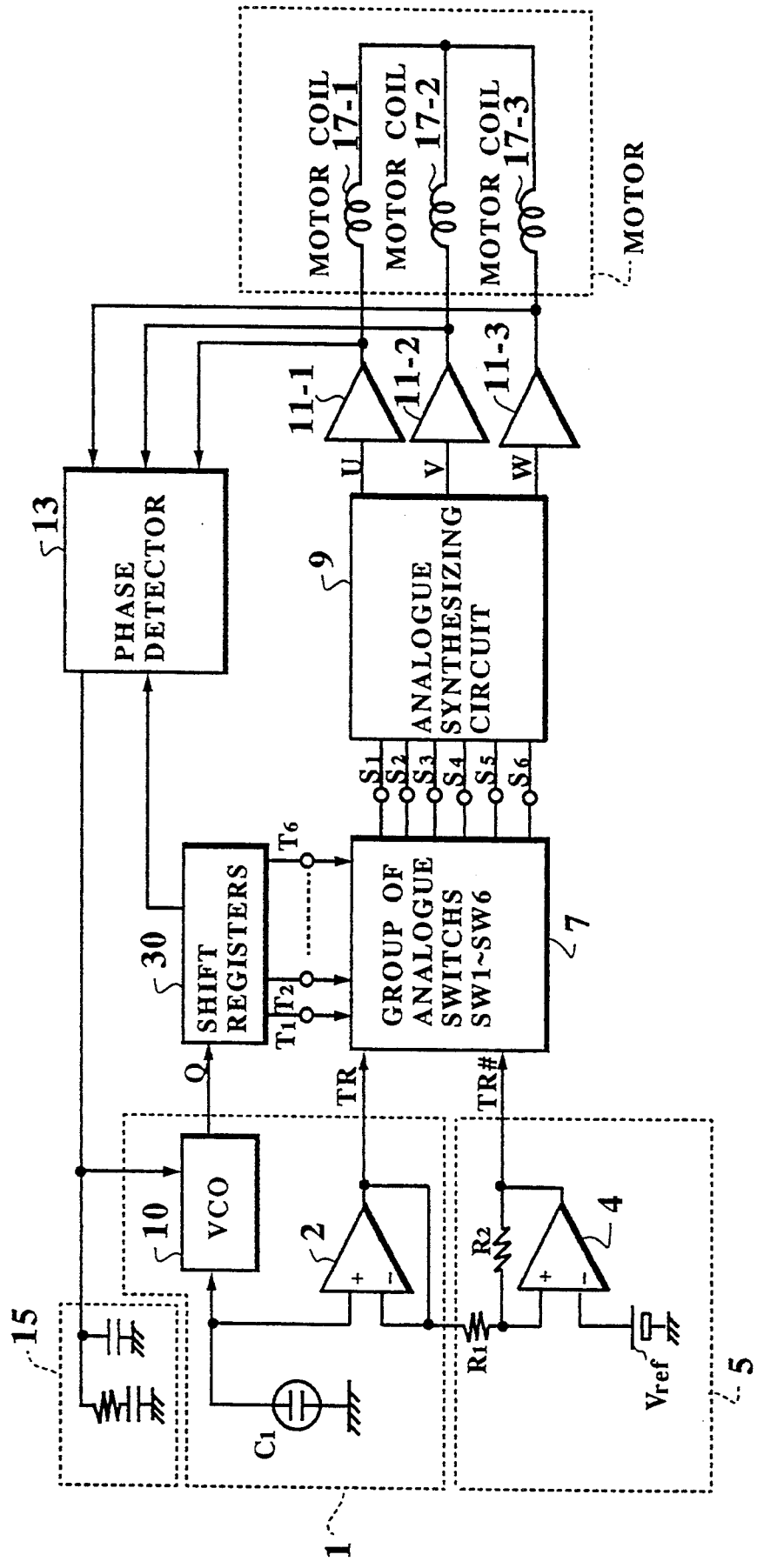
FIG. 2 is a configuration drawing of an electric waveform generating circuit for one embodiment of a brushless motor of the present invention.

FIG. 2 is a configuration drawing of an electric waveform generating circuit 200 for one preferred embodiment of a brushless motor of the present invention. In the drawing, the electric waveform generating circuit 200 for the brushless motor of this embodiment comprises a variable frequency generating means 10 (hereinafter referred to as a Voltage Controlled Oscillator, or VCO for short), a condenser C1, an operational amplifier 2, a pair of resistances R1 and R2, an operational amplifier 4, a shift register 30, an analogue switch group 7, an analogue synthesizing circuit 9, a plurality of output circuits 11-1 to 11-3, a phase detector 13, a phase compensation circuit 15, and a plurality of motor coils 17-1 to 17-3.

The condenser C1 is connected to the VCO 10 and a triangular wave TR is generated by a charging and discharging current from the VCO 10. The period of the triangular wave TR is varied by varying the value of the charging and discharging current.

The operational amplifier 2 with a voltage follower is connected to the output of the VCO 10, and the output from the operational amplifier 2 is the triangular wave TR.

An inverting circuit 5 comprising the resistances R1 and R2 and the operational amplifier 4 is used as an inverting means for generating an inverted triangular wave TR# from the triangular wave TR.

Figure 3A:
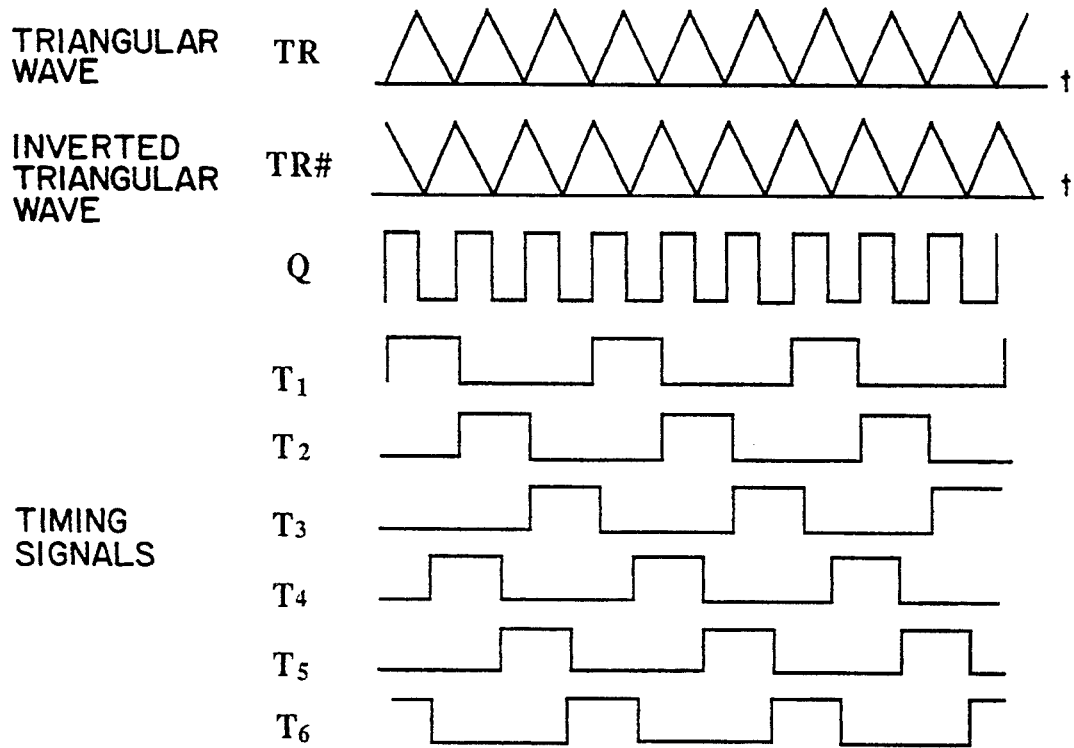
FIGS. 3A and 3B are a waveform diagram for various signals for an electric waveform generating circuit for the embodiment of a brushless motor of the present invention.

The reference sign "Vref" in the inverting circuit 5 in FIG. 2 means a level of an intermediate voltage of a triangular waveform "TR" shown in FIG. 3A. The inverted triangular waveform TR# is generated by the inverting circuit 5 based on the intermediate voltage "Vref".

A shift register 30 is used as the pulse generating means 3 shown in FIG. 1. A plurality of specified timing pulse signals T1 to T6 is generated, synchronized with the oscillation period of the VCO 10, by means of a charging and discharging switching signal Q from the VCO 10 (see FIG. 3).

Figure 3B:
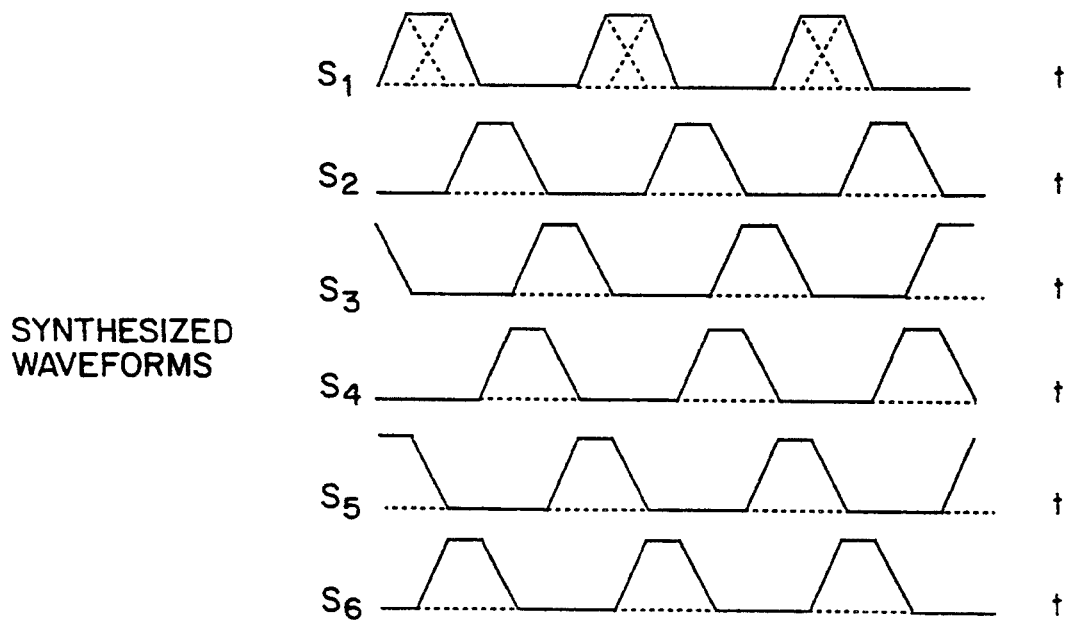

In the analogue switch group 7, twelve analogue switches are provided which are opened and closed under the control of the pulse signals T1 to T6 from the shift registers 30 for synthesizing the triangular wave TR and the inverted triangular wave TR#, and for generating a plurality of synthesized signals S1 to S6 (see FIGS. 3A and 3B).

For example, the synthesized signal S1 shown in FIG. 3B is a synthesized wave for both a signal which switches the triangular wave TR on and off based on the pulse signal T1 from the analogue switch SW1, and a signal which switches the inverted triangular wave TR# on and off based on the pulse signal T4 from the analogue switch SW2. Thus, $$S_1 = T_1 \times TR + T_4 \times TR\#$$

The synthesized signal S2 shown in FIG. 3B is a synthesized wave for both a signal which switches the triangular wave TR on and off based on the pulse signal T2 from the analogue switch, and a signal which switches the inverted triangular wave TR# on and off based on the pulse signal T5 from the analogue switch. Thus, $$S_2 = T_2 \times TR + T_5 \times TR\#$$

The synthesized signal S3 shown in FIG. 3B is a synthesized wave for both a signal which switches the triangular wave TR on and off based on the pulse signal T3 from the analogue switch, and a signal which switches the reversed triangular wave TR# on and off based on the pulse signal T6 from the analogue switch. Thus, $$S_2 = T_2 \times TR + T_5 \times TR\#$$

The synthesized signal S4 shown in FIG. 3B is a synthesized wave for both a signal which switches the triangular wave TR on and off based on the pulse signal T5 from the analogue switch, and a signal which switches the inverted triangular wave TR# on and off based on the pulse signal T3 from the analogue switch. Thus, $$S_4 = T_4 \times TR + T_3 \times TR\#$$

The synthesized signal S5 shown in FIG. 3B is a synthesized wave for both a signal which switches the triangular wave TR on and off based on the pulse signal T6 from the analogue switch, and a signal which switches the inverted triangular wave TR# on and off based on the pulse signal T1 from the analogue switch. Thus, $$S_5 = T_6 \times TR + T_1 \times TR\#$$

The synthesizes signal S6 shown in FIG. 3B is a synthesized wave for both a signal which switches the triangular wave TR on and off based on the pulse signal T4 from the analogue switch, and a signal which switches the inverted triangular wave TR# on and off based on the pulse signal T2 from the analogue switch. Thus, $$S_6 = T_4 \times TR + T_2 \times TR\#$$

Figure 4A:
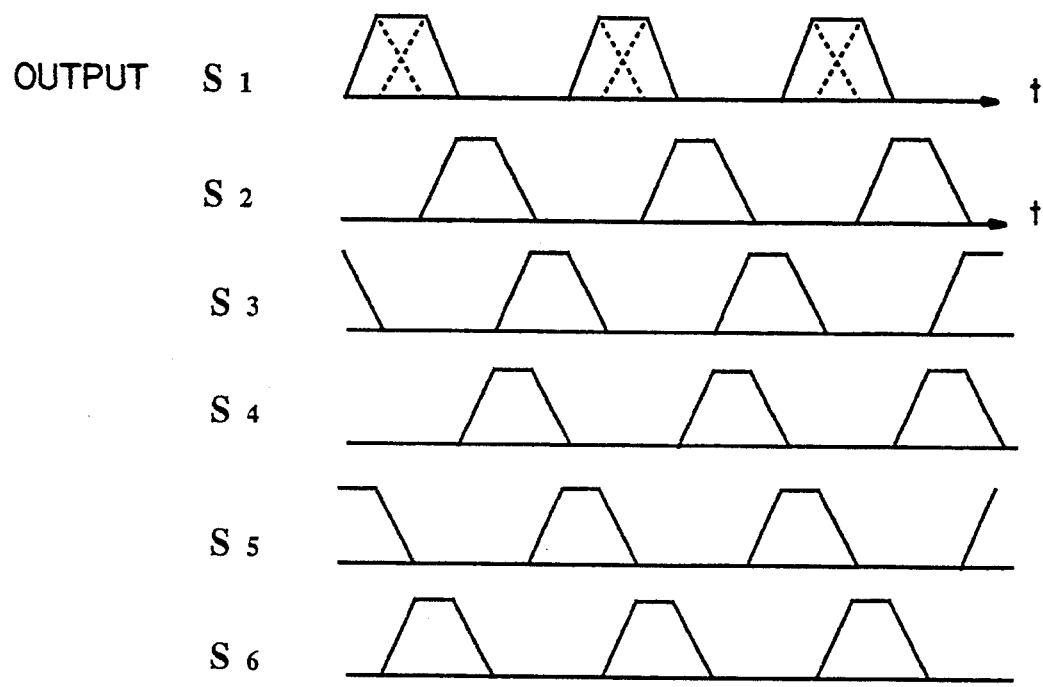
FIGS. 4A and 4B are a waveform diagram of a trapezoidal waveform for an electric waveform generating circuit in the embodiment of a brushless motor of the present invention after analogue synthesis.
Figure 4B:
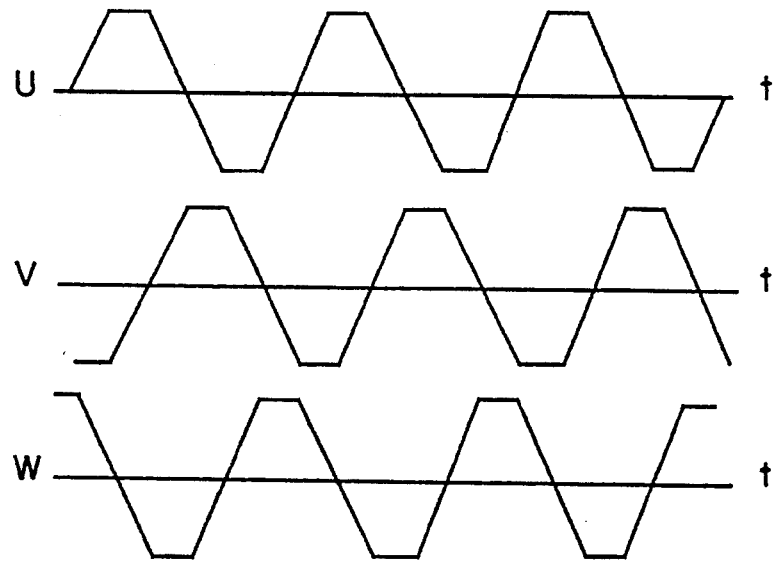

An analogue synthesizing circuit 9 is used as the synthesizing means and as shown in FIGS. 4A and 4B, generates a plurality of trapezoidal waves U, V, and W from the synthesized signals S1 to S6.

For example, the trapezoidal wave U shown in FIG. 4B is generated by subtracting the synthesized signal S4 from the synthesized signal S1. Thus, $$U = S_1 - S_4$$

The trapezoidal wave V shown in FIG. 4B is generated by subtracting the synthesized signal S5 from the synthesized signal S2. Thus, $$V = S_2 - S_5$$

The trapezoidal wave W shown in FIG. 4B is generated by subtracting the synthesized signal S3 from the synthesized signal S6. Thus $$W = S_3 - S_6$$

In addition, the electric waveform generating circuit 200 further comprises the output circuits 11-1 to 11-3, which drive the trapezoidal waves U, V, and W, and the phase detector 13, which detects the phases of the trapezoidal waves U, V, and W, maintain the stability of the loop of the circuit based on the PLL method, the phase compensation circuit 15, and the motor coils 17-1 to 17-3 for determining the performance of the PLL circuit for determining the starting response of the motor and the like.

The electric waveform generating circuit 200 for a brushless motor of this embodiment is the basic structure of a control circuit for driving a three-phase motor. The analogue-synthesized trapezoidal waves U, V, and W pass through the output circuits 11-1 to 11-3, and become commutation signals for the motor coils 17-1 to 17-3. As a result of this electrical flow, the motor starts to rotate, and, simultaneously, magnetic induction is produced from the rotation of the motor. This causes a voltage to be generated.

The phase of the cycle of this generated voltage is compared with that of a standard cycle from the shift register 30, using the phase detector 13. The output from the detected phase is transmitted to an input terminal for controlling the oscillation frequency of the VCO 10, and the rotational cycle of the motor is synchronized with the oscillation cycle of the VCO 10 by regulating the frequency.

As outlined above, in this embodiment of the present invention a three-phase trapezoidal wave is generated by synthesizing the triangular wave TR and the inverted triangular wave TR#. The trapezoidal wave is used as a commutation signal for a three phase motor so that the soft-switching becomes possible, and the electromagnetic noise and commutation noise from the motor can be restrained.

Although the preferred embodiment was explained above with reference to a three-phase motor, it is not limited to a three-phase motor but can also be used to generate wave forms for single-phase motors as well as multi-phase motors.

In addition, the present invention can be applied for a single-side trapezoidal waveform only, prior to analogue synthesis, depending on the structure of the motor coils.

Further, the shape of the trapezoidal waveform is not limited to the shape illustrated in the present embodiment. Any shape which can be synthesized from a triangular wave is acceptable.

Figure 5A:
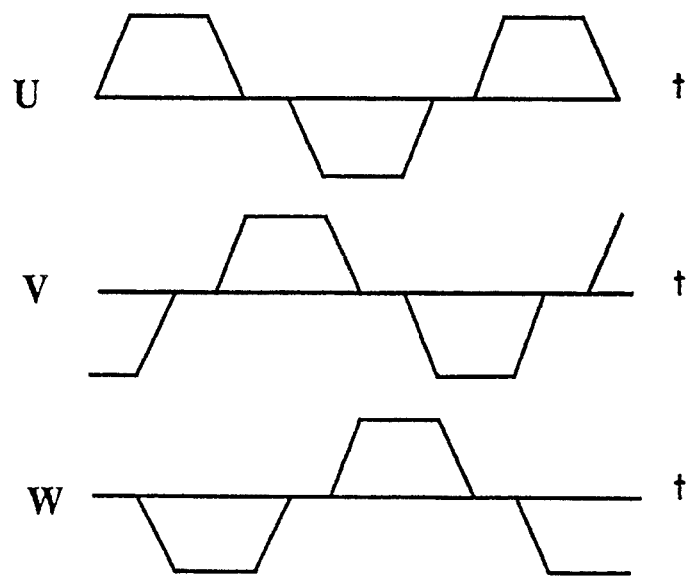
FIG. 5A is a waveform diagram for trapezoidal waveforms synthesized from three different triangular waveforms as an example of a first modification of the embodiment.
Figure 5B:
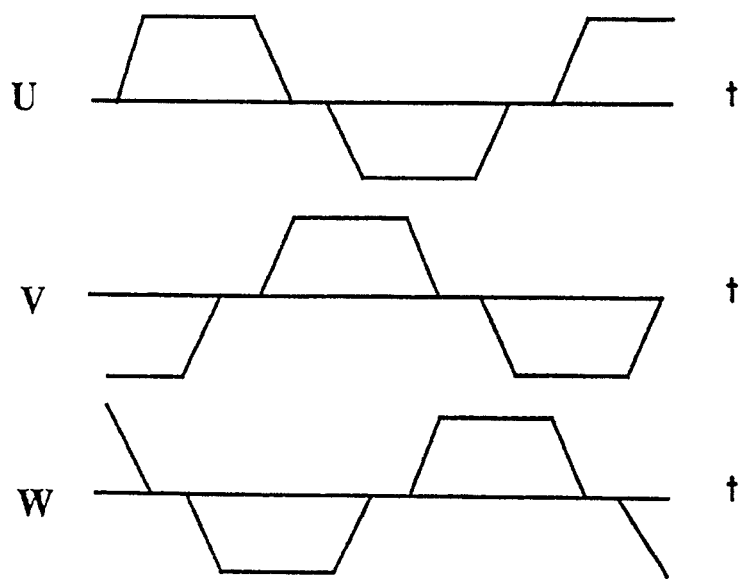
FIG. 5B is a waveform diagram for trapezoidal waveforms synthesized from four different triangular waveforms as an example of a second modification of the embodiment.

FIG. 5A is a waveform diagram for trapezoidal waveforms synthesized from three different triangular waveforms as an example of a first modification of the embodiment, and FIG. 5B is a waveform diagram for trapezoidal waveforms synthesized from four different triangular waveforms as an example of a second modification of the embodiment.

By means of the above embodiment, a triangular wave is generated by a variable frequency generating means and an inverted triangular wave is generated from the triangular wave by means of an inverting means. The triangular wave and the inverted triangular wave are switched on and off under the control of specified timing signals synchronized to the oscillation cycle of the variable frequency generating means by the analogue switch group 7.

In addition, a waveform of a three-phase trapezoidal wave or the like synthesized from the output of at least one analogue switch in the analogue switch group is output from the synthesizing means. Because this trapezoidal wave is used as a commutation signal for a three-phase motor, software switching is made possible and the electromagnetic noise and commutation noise from the motor can be restrained.

Also, because a waveform for software switching is obtained from the variable frequency generating means, the amount of magnetic noise and noise resulting from rotation is small. In addition, the number of externally-mounted parts is small and large-scale internal circuitry is eliminated.

What is claimed is:

1. An electric waveform generating circuit for a brushless motor, comprising:
    frequency generating means for generating a triangular wave;

inverting means for generating an inverted triangular wave obtained by inverting the triangular wave from the frequency generating means;

analog switch means for operatively combining the triangular wave from the frequency generating means and the inverted triangular wave from the inverting means based on a specified timing signal synchronized with an oscillating cycle of the triangular wave from the frequency generating means; and synthesizing means for synthesizing the input from the analog switch means and outputting a synthesized wave form.

2. An electric waveform circuit for a brushless motor comprising:

frequency generating means for generating a triangular wave;

pulse generating means for generating a specified timing signal synchronized with an oscillating cycle of the triangular wave from the frequency generating means;

inverting means for generating an inverted triangular wave by inverting in phase the triangular wave from the frequency generating means;

a group of analog switches which operatively combines the triangular wave from the frequency generating means and the inverted triangular wave from the inverting means the specified timing signal from the pulse generating means; and synthesizing means for outputting a synthesized wave form by synthesizing the output from at least one of the analog switches in the group of analog switches.

3. An electric waveform generating circuit for a brushless motor as claimed in claim 1, wherein the synthesizing means outputs a three-phase trapezoidal waveform.

4. An electric waveform generating circuit for a brushless motor as claimed in claim 1, wherein the output from the synthesizing means is utilized as a commutation signal for operation of the brushless motor having a plurality of phases.

5. An electric waveform generating circuit for a brushless motor as claimed in claim 1, wherein the output from the synthesizing means is utilized as a commutation signal for operation of a single-phase brushless motor.

6. An electric waveform generating circuit for a brushless motor as claimed in claim 1, wherein the output from the synthesizing means is utilized as a commutation signal for operation of a two-phase brushless motor.

7. An electric waveform generating circuit for a brushless motor as claimed in claim 1, wherein the output from the synthesizing means is utilized as a commutation signal for operation of a three-phase brushless motor.

8. An electric waveform generating circuit for a brushless motor as claimed in claim 2, wherein the output from the synthesizing means is utilized as a commutation signal for a three-phase brushless motor.

9. An electric waveform generating circuit for a brushless motor as claimed in claim 1, wherein the synthesized wave from the synthesizing means is input as a commutation signal for the operation of the motor.

* * * * *